April 12, 1966  T. J. REINHART, JR  3,245,853
METHOD FOR MAKING TOROIDAL PNEUMATIC TIRES
Filed June 25, 1963  2 Sheets-Sheet 2

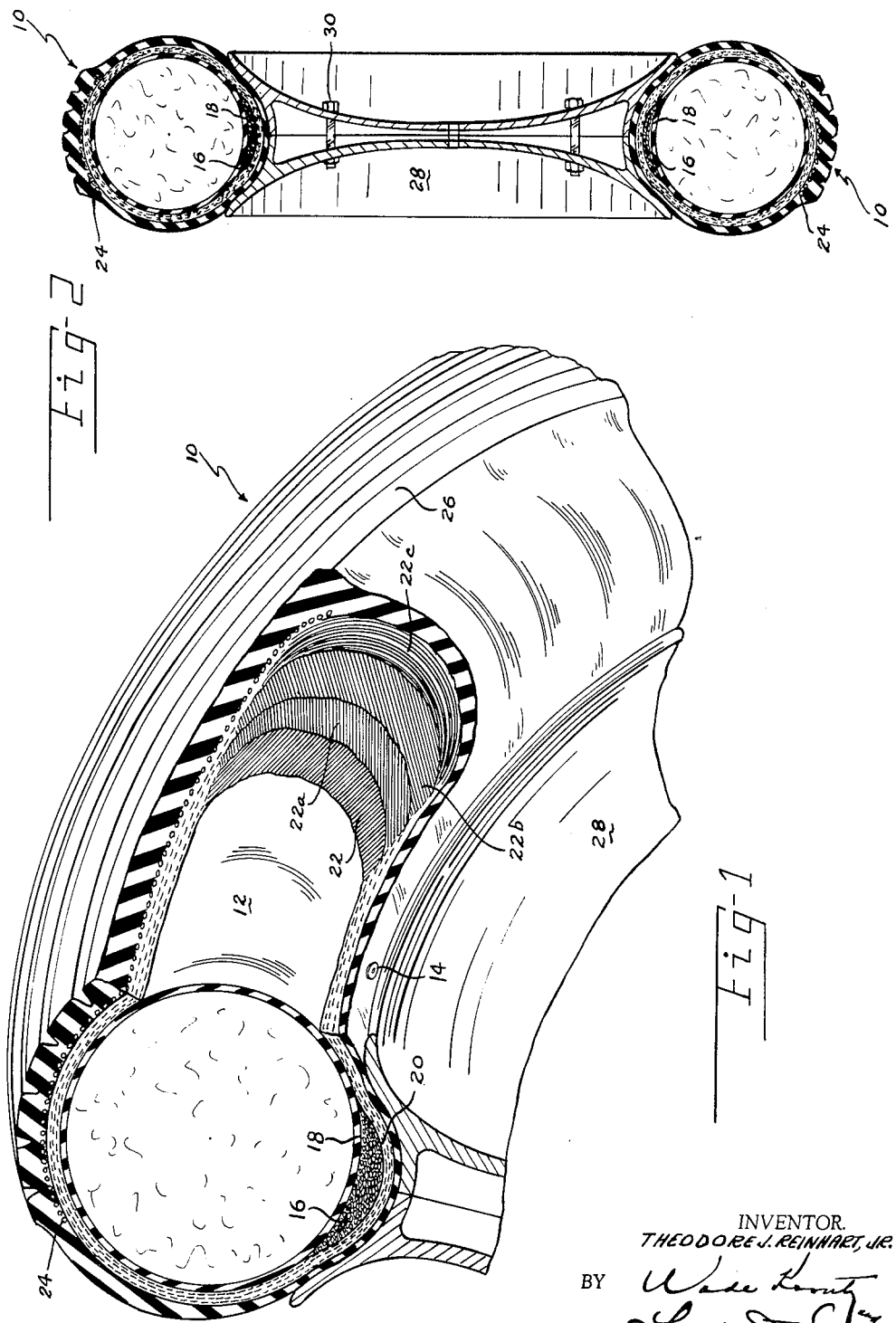

INVENTOR.
THEODORE J. REINHART, JR.
BY
ATTORNEYS

United States Patent Office 3,245,853
Patented Apr. 12, 1966

3,245,853
METHOD FOR MAKING TOROIDAL
PNEUMATIC TIRES
Theodore J. Reinhart, Jr., 4116 Woodedge Drive,
Bellbrook, Ohio
Filed June 25, 1963, Ser. No. 290,566
2 Claims. (Cl. 156—117)

The invention described herein may be manufactured and used by or for the Government for governmental purposes without the payment to me of any royalty thereon.

This invention relates to the making of pneumatic tires having the general form of a toroid, such as disclosed in the co-pending application Toroidal Pneumatic Tire, Serial No. 229,766, filed October 10, 1962, and now United States Patent No. 3,171,462 issued March 2, 1965.

Tires made in accordance with the invention to be hereinafter disclosed are intended to provide an improved structure capable of overcoming many of the difficulties encountered when conventional tires are used on heavy-duty applications.

While not limited to such use, and for purposes of illustration, tires in accordance with this invention will be shown and described for use on aircraft.

Through the years, airplanes have become heavier, faster and more difficult to control. The present-day long range bomber is extremely heavy; and the landing impact on the tires is most destructive. Such bombers use tricycle landing gears having tandem rear wheels in order to provide sufficient tire capacity to absorb the landing impact.

The airplane must make a perfect landing in order to utilize the full tire capacity on the airplane. A nonperfect landing is extremely detrimental in that the full impact shock must be absorbed by a portion of the tires.

An extremely detrimental landing is one in which the airplane is canted; thus causing the full landing impact to fall on the outside tires on one side of the airplane. This type of landing pushes the bead of the tire away from the wheel flange, and on tubeless tires can cause a loss of air.

One important object of this invention is to provide a method for producing high strength tires in the form of a toroid.

Another important object of this invention is to provide a method for forming a high strength tape or filament wound pneumatic tire.

A further object of this invention is to produce a tire having substantially uniform carcass strength.

Another object of this invention is to provide a tire construction method requiring fewer hand labor operations in its manufacture.

Yet another object of this invention is to provide a tire construction process eliminating conventional tire beads around which the loose ends of carcass fabrics must be wrapped.

Additional objects, advantages and features of the invention reside in the method of construction, arrangement and combination of parts involved in the embodiment of the invention as will appear from the following description and accompanying drawings, wherein:

FIG. 1 is a perspective of a portion of the tire in operating relation to the wheel rim and partially broken to show construction details;

FIG. 2 is a cross-section through the tire and wheel;

Figure 3:
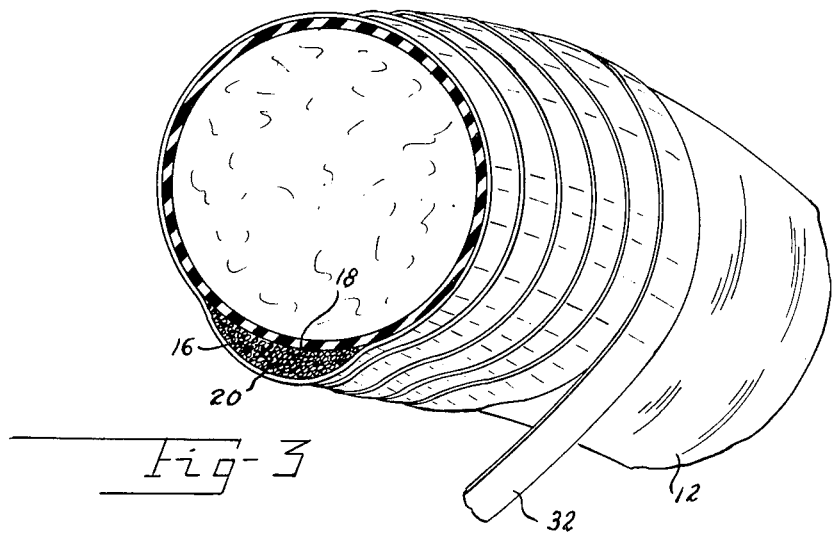
FIG. 3 shows the method of forming a typical ply from tape.

Referring to the drawings, the tire referred to generally as tire 10 is in the form of a toroid. An air sealing inner tube 12, having an air valve 14, forms an inflatable mandrel on which the reinforcing plies are wound. Any foreign matter on the outside surface of the tube 12 is removed; after which the surface of the tube is primed with a suitable bonding agent such as rubber cement. A preformed flexible reinforcing ring 16, having a concave surface 18 mating the inner periphery of the outer surface on the inner tube, and a convex surface 20 of the general configuration of the wheel rim on which the tire is to be used, is placed as shown on FIG. 1.

The reinforcing ring may be of any suitable materials and construction suitable for providing a firm base for retaining the tire within the rim of the wheel on which it is to be mounted. One suitable form of reinforcing ring is made in the conventional manner of a plurality of wires insulated from each other by a cured rubber-like compound and fabric covered.

After the reinforcing ring 16 has been properly placed on the inner tube 12, the subassembly so formed is placed in a commercial winding machine which wraps a predetermined number of flexible plies. The plies are preferably formed of tapes made of calendered fabric of predetermined gauge and width which may or may not be impregnated with rubber-type insulating materials. The tapes are helically wrapped around the inner tube 12 and reinforcing ring 16 with butting or overlapping edges as shown on FIG. 3 to provide the desired number of layers or plies as shown by plies 22, 22a, 22b and 22c on FIG. 1. If desired, bonding materials may be applied between successive plies. The successive plies may be continuous, wrapped from the same tape; or the plies may be built up from several types of tape as, for example, a ply or fabric tape made of nylon followed by a ply of tape containing metallic wire, followed by another fabric tape. Likewise, the successive tapes may all be wrapped in the same direction, or a portion of the plies may be wrapped in opposite directions in criss-cross fashion as shown on FIG. 4.

After all the plies are built-up around the inner tube and reinforcing ring, the subassembly so formed is removed from the wrapping machine. A flexible reinforcing breaker 24 is circumferentially applied to the crown of the subassembly as shown on the drawings. The breaker may be made and applied in a manner well-known to the tire art. Suitable tread compound 26 is then applied to encase or encompass the carcass so formed and the tire is then heat cured in a heated mold by the conventional manner which is well-known to the tire art.

In use, the completed tire may be mounted on a conventional split wheel 28, the two halves of which are held in place by bolts 30.

Figure 4:
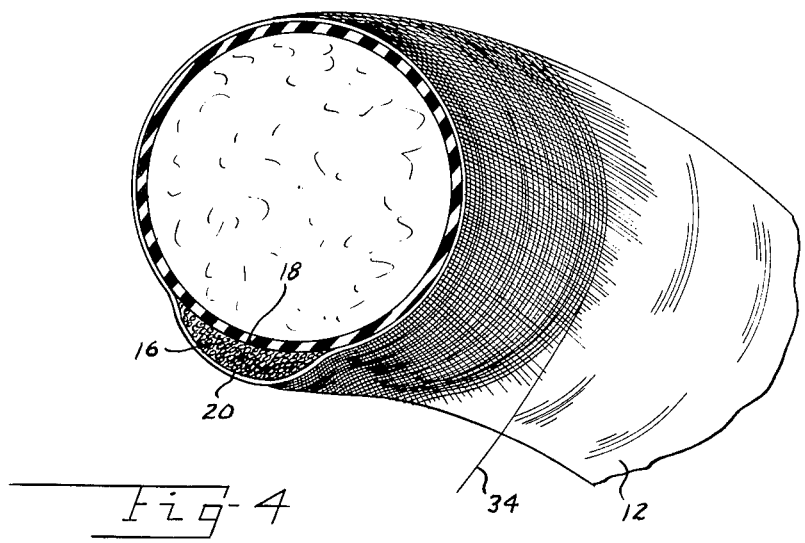
FIG. 4 shows, in exaggerated form for clarity, the method of forming adjacent plies from filaments.

A second embodiment of the invention uses filaments 34 as shown on FIG. 4 instead of the tapes 32 shown on FIG. 3. The filaments may be made of the same materials used to make the tapes. When forming the plies from filaments, it is preferable that alternate plies be wrapped in opposing directions about the carcass in criss-cross fashion in order to prevent intermingling of the filaments of one ply with the filaments on an adjacent ply.

One alternate method of forming the mandrel on which the tape is wrapped to form the plies of the tire carcass, is to fill the inner tube 12 through the air valve 14 with a suitable cold-hardening, soluble material such as the thermoplastic Rezolin manufactured by Rezolin Manufacturing Corporation. This material may be put into solution and flushed out of the tube after the tire has been formed. The net result of the alternate method over the first method of construction is to substitute a nondeformable mandrel for one having a degree of deformability.

A second alternate method of forming the mandrel is to cast or mold a toroidal form from soluble material such as the above-mentioned Rezolin. The material forming the inner tube 12 is then wrapped around the solidified form and all seams sealed and cured. After the tire is formed, the soluble material is flushed through the air valve 14.

Although, for purposes of illustration, the drawings show a tire of circular cross section, other cross-sectional forms may be used; for example, an ellipsoidal form having its major axis parallel to the axis through the tire.

Tires made in accordance with this invention may be made from a variety of materials. For example, the tapes may contain natural and synthetic fibers as well as metallic threads. The tread compound likewise may be made of any suitable material, such as natural and synthetic rubber compounds in any desired combination.

It is to be understood that the embodiments of the present invention as shown and described are to be regarded as illustrative only and that the invention is susceptible to variations, modifications and changes within the scope of the appended claims.

I claim:

1. The method of producing a pneumatic tire comprising the steps of filling a toroidal sealing member to proper configuration with a cold hardening soluble material, placing a flexible reinforcing ring adjacent to the inside diameter of said sealing member, placing at least one ply built-up of tape helically wrapped around said sealing member and said reinforcing ring, placing a flexible breaker circumferentially to the crown of the subassembly formed by said sealing member, reinforcing ring and plies, encompassing the structure so formed in tread compound, removing the hardened soluble material from the sealing member and curing the tire so formed in a mold under heat.

2. The method of producing a pneumatic tire comprising the steps of filling a toroidal sealing member to proper configuration with a cold hardening soluble material, placing a flexible reinforcing ring adjacent to the inside diameter of said sealing member, placing at least two plies built-up of filaments helically wrapped around said sealing member and said reinforcing ring with adjacent plies wrapped in opposite directions in criss-cross fashion, placing a flexible breaker circumferentially to the crown of the subassembly formed by said sealing member, reinforcing ring and plies, encompassing the structure so formed in tread compound, removing the hardened soluble material from the sealing member and curing the tire so formed in a mold under heat.

References Cited by the Examiner

UNITED STATES PATENTS

| 467,642 | 1/1892 | Palmer | 152—354 X |
|---|---|---|---|
| 969,131 | 8/1910 | Cobb | 156—133 |
| 2,605,200 | 7/1952 | Iknayan | 156—123 X |
| 2,915,102 | 12/1959 | Alexeff et al. | 156—123 X |
| 3,183,134 | 5/1965 | Frisby | 156—117 |

FOREIGN PATENTS

| 519,249 | 3/1955 | Italy. |
|---|---|---|
| 26,874 | 1912 | Great Britain. |

EARL M. BERGERT, *Primary Examiner.*

C. B. COSBY, *Examiner.*